US010159194B2

(12) United States Patent
Sergyeyenko

(10) Patent No.: US 10,159,194 B2
(45) Date of Patent: Dec. 25, 2018

(54) HEDGETRIMMER WITH SAW BLADE

(71) Applicant: BLACK & DECKER INC., New Britain, CT (US)

(72) Inventor: Oleksiy Sergyeyenko, Baldwin, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 15/697,599

(22) Filed: Sep. 7, 2017

(65) Prior Publication Data

US 2017/0367271 A1     Dec. 28, 2017

Related U.S. Application Data

(63) Continuation-in-part of application No. 14/848,960, filed on Sep. 9, 2015, now Pat. No. 9,750,197.

(51) Int. Cl.
*A01G 3/053* (2006.01)
*B23D 61/18* (2006.01)

(52) U.S. Cl.
CPC .......... *A01G 3/0535* (2013.01); *A01G 3/053* (2013.01); *B23D 61/18* (2013.01)

(58) Field of Classification Search
CPC ....... A01G 3/053; A01G 3/0535; B23D 61/18
USPC ......................................................... 30/223
See application file for complete search history.

(56) References Cited

U.S. PATENT DOCUMENTS

| 3,143,798 A | 8/1964 | Lundquist |
| 3,200,493 A * | 8/1965 | Dodegge ............... A01G 3/053 30/216 |
| 3,217,408 A | 11/1965 | Jepson et al. |
| 3,309,769 A | 3/1967 | Maxson |
| 3,340,612 A | 9/1967 | Knight |
| 3,364,574 A | 1/1968 | Stelljes et al. |
| 3,564,714 A * | 2/1971 | Wells ..................... A01G 3/053 30/223 |
| 3,579,827 A | 5/1971 | Grahn |
| 3,751,805 A | 8/1973 | Grahn |
| 3,798,768 A * | 3/1974 | Cowley .................. A01G 3/053 30/223 |
| 4,280,276 A | 7/1981 | Comer et al. |
| 4,592,142 A * | 6/1986 | Schnizler .............. A01G 3/053 30/210 |
| 4,619,045 A * | 10/1986 | Mayer .................... A01G 3/053 30/216 |

(Continued)

FOREIGN PATENT DOCUMENTS

| DE | 4300215 | 7/1994 |
| EP | 0422773 | 4/1991 |

(Continued)

OTHER PUBLICATIONS

EP Search Report dated May 31, 2017, for Ep Application No. EP 16187125.

*Primary Examiner* — Hwei C Payer
(74) *Attorney, Agent, or Firm* — John Yun

(57) ABSTRACT

A hedgetrimmer having a blade assembly that includes a sawblade for cutting through larger branches and other vegetative foliage. The blade assembly includes a reciprocating blade having an integrally formed sawblade portion that moves back and forth cutting motion. The other blade is fixed and includes a bevelled interior edge that helps debris being cut to pass over the blade and prevent getting stuck.

11 Claims, 9 Drawing Sheets

(56) References Cited

U.S. PATENT DOCUMENTS

| | | | |
|---|---|---|---|
| 4,651,420 A | | 3/1987 | Lonnecker |
| 5,031,395 A | | 7/1991 | Ohkanda et al. |
| 5,075,972 A | * | 12/1991 | Huang .................... A01G 3/053 30/196 |
| 5,093,999 A | * | 3/1992 | Raetz ..................... A01G 3/053 30/210 |
| 5,426,856 A | * | 6/1995 | Aiyama ................. A01G 3/053 30/208 |
| 5,581,891 A | * | 12/1996 | Wheeler ................ A01G 3/053 30/216 |
| 6,263,579 B1 | * | 7/2001 | Nagashima ............ A01G 3/053 30/216 |
| 8,613,144 B2 | | 12/2013 | Chun |
| 8,713,803 B2 | * | 5/2014 | Heinzelmann ......... A01G 3/053 30/206 |
| 9,750,197 B2 | * | 9/2017 | Sergyeyenko ......... B23D 61/18 |
| 2007/0101581 A1 | | 5/2007 | Carls |
| 2008/0250656 A1 | | 10/2008 | Lewis |
| 2009/0188361 A1 | | 7/2009 | Simpson et al. |
| 2012/0167395 A1 | * | 7/2012 | Duffy ..................... A01G 3/053 30/223 |
| 2012/0167741 A1 | | 7/2012 | Duffy et al. |
| 2013/0160304 A1 | * | 6/2013 | Tate ........................ B25F 5/02 30/381 |
| 2017/0064909 A1 | | 3/2017 | Sergyeyenko |
| 2017/0367271 A1 | * | 12/2017 | Sergyeyenko ....... A01G 3/0535 |

FOREIGN PATENT DOCUMENTS

| | | | |
|---|---|---|---|
| EP | 0974434 | | 1/2000 |
| GB | 768030 | * | 2/1957 |
| GB | 2383249 | | 6/2003 |

\* cited by examiner

HEDGETRIMMER WITH SAW BLADE

CROSS-REFERENCE TO RELATED APPLICATION

This application is a continuation-in-part of U.S. patent application Ser. No. 14/848,960 filed Sep. 9, 2015, now U.S. Pat. No. 9,750,197, entitled HEDGETRIMMER WITH SAW BLADE. The entire disclosures of the above applications are incorporated herein by reference.

FIELD OF THE INVENTION

The present invention relates to vegetation cutting devices, specifically hedgetrimmers having a blade assembly with saw-like teeth for cutting through large branches.

BACKGROUND OF THE INVENTION

Vegetation cutting devices such as hedge trimmers are known power operated tools for cutting hedges and other foliage and vegetation. Typically hedge trimmers are powered by a gas engine or electric motor that drives a blade assembly comprising a pair of reciprocating blades. The teeth on the blades are spaced from one another so that while reciprocating, they create gaps for bush and hedge branches to enter and be cut. These blade teeth have cutting edges along their flanks so that they create a shearing cutting action when the blades reciprocate. However, occasionally large branches are encountered that are too big to enter the gap, or even if they can enter, are too thick to be cut by the blades. Therefore, it would be advantageous to have blade assemblies having cutting edges along the tips of the teeth so as to create a saw-like cutting action to be able to cut through thicker branches.

Such blade assemblies in hedgetrimmers are known in the art, and are shown for example in U.S. Pat. No. 3,751,805 ("the '805 patent"). In the '805 patent, the sawblade is attached to the reciprocating hedgetrimmer blade using a nut and bolt, which are spot welded to the blade. The process of welding bolts to the hedgetrimmer blade and using a nut and bolt increases the complexity and manufacturing cost of such as design.

Another example is U.S. Pat. No. 3,217,408 ("the 408 patent") which shows a hedgetrimmer with a saw blade that is again bolted to the reciprocating blade of a hedgetrimmer. Here, however, the saw blade is fixed on a first side of the hedgetrimmer blade with the hedgetrimmer teeth on a second side. Therefore, only one side of the hedgetrimmer has the shearing cutting teeth which limits its versatility.

Yet another example is U.S. Pub. No. 2012/0167741 which shows a pair of hedgetrimmer blades that have integrally formed end sections that have teeth that are sharpened to their tips to provide a saw-like action to cut through thicker branches. However, because the blades are integrally formed, they would require entirely new tooling to manufacture, and therefore increases manufacturing costs.

Therefore, it would be advantageous to have a hedgetrimmer blade assembly that includes a saw blade for cutting through thick branches. Furthermore, it would be advantageous to have a blade assembly that is easy and cost efficient to manufacture.

BRIEF SUMMARY OF THE INVENTION

Therefore, according to an aspect of the invention, the present invention is directed to a hedgetrimmer having a sawblade, where the hedgetrimmer has a housing containing a motor, and a blade assembly extending out from the housing, having a first and second blade for cutting vegetation. The first and second blade include cutting teeth forming a first configuration. A sawblade is secured to a distal end of the blade assembly with the sawblade having cutting teeth forming a second configuration.

In one aspect of the invention, the sawblade can include one of a notch or a projection, and the one of the blades of the blade assembly can have the other of a notch or a projection so that the sawblade is secured to the hedgetrimmer blade by securing the notch to the projection. This structure allows for a cost efficient method of manufacturing the combined hedgetrimmer blade and sawblade. Additionally, the sawblade can be integrally manufactured with the hedgetrimmer blade if desired.

In another aspect of the invention, the sawblade can be formed integrally with one of the one of two reciprocating blades. Alternatively, the hedgetrimmer may have only a single reciprocating blade, and the other blade may be fixed. In this case, the sawblade can be formed integrally on the reciprocating blade.

In another aspect of the invention, the hedgetrimmer can include a bracket secured to the support bar to support vegetation as it's being cut by the sawblade assembly. This helps stabilize the vegetation for improved cutting. Additionally, a guard bar can be provided that is pivotally secured a distal end of the support bar, with the guard bar being movable between a retracted position and an extended position where it's tip extends beyond the blade assembly. In this way, the guard bar helps to protect any structure from being damaged by the moving sawblade.

A method of manufacturing the hedgetrimmer blade of the present invention is also disclosed, where a standard blade having a series of cutting teeth on a first and second side is further stamped so that selected cutting teeth are reshaped to form the projections used to secure the sawblade. The sawblade, having corresponding apertures are then pressfit onto the projections to secure the sawblade. Other machining or finishing processes can be performed to further secure the sawblade to the hedgetrimmer blade.

BRIEF DESCRIPTION OF THE INVENTION

Further features and advantages of the present invention will be better understood by reference to the following description, which is given by way of example and in association with the accompanying drawings, in which.

DETAILED DESCRIPTION OF THE INVENTION

Figure 1:
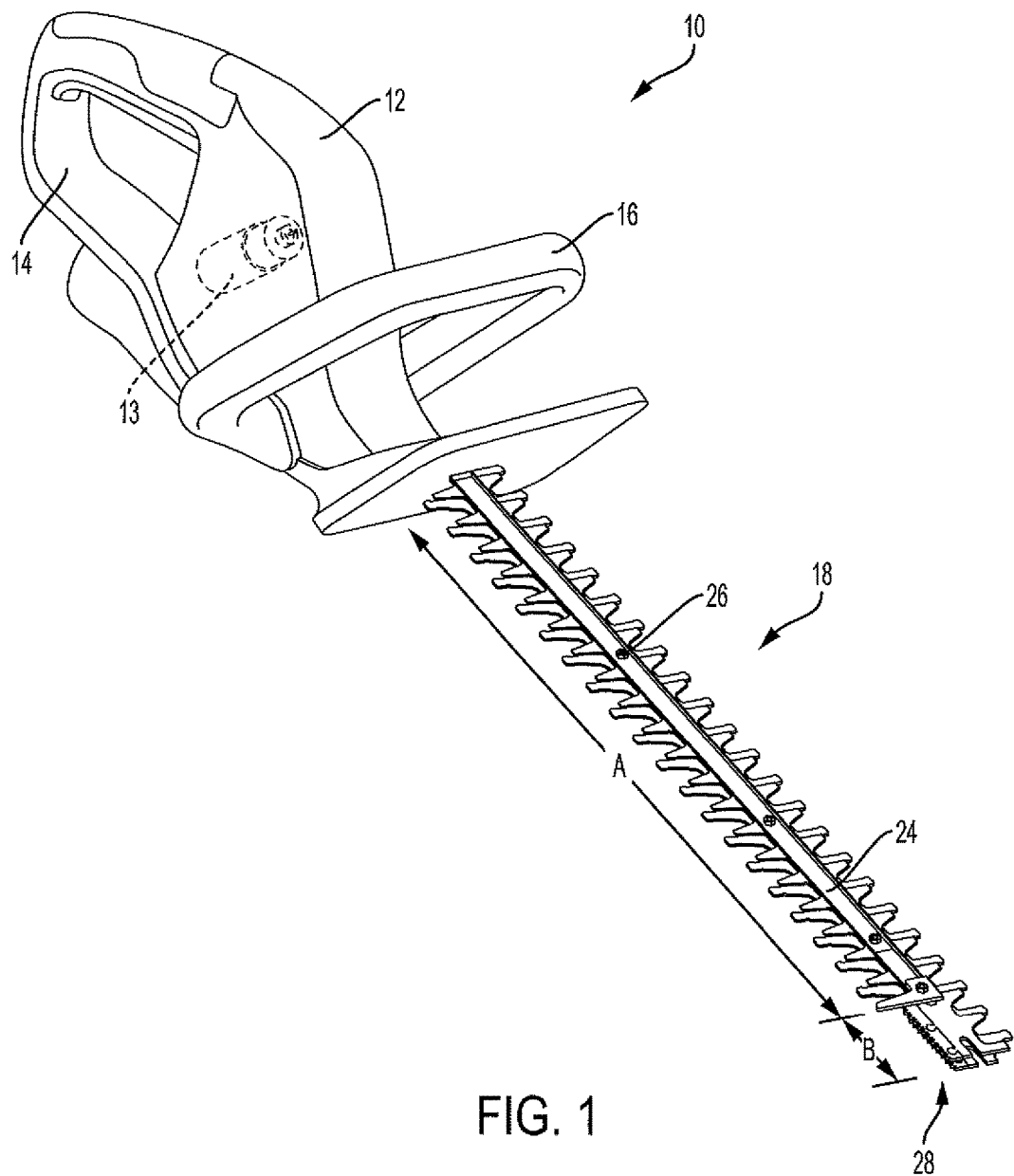
FIG. 1 is a front perspective view of a hedgetrimmer according to an embodiment of the invention.

FIG. 1 shows a hedgetrimmer 10 according to an embodiment of the present invention. The hedgetrimmer 10 has a housing 12 containing an electric motor 13. The housing includes a rear handle 14 and a front auxiliary handle 16. A user is required to place his hands on both handles to securely and safely operate the tool. In a preferred embodiment, the motor 13 is an electric motor powered by a rechargeable battery. Alternatively, the electric motor can be powered by mainline electricity provided through an electrical cord, or could be an engine powered by gasoline or other combustible fuel.

The hedgetrimmer includes a blade assembly 18 having a pair of reciprocating blades, a top blade 20 and a bottom blade 22. See FIG. 2. The blades are secured to a support bar 24 and the support bar 24 is fixedly secured to the housing 12. The top and bottom blades 20, 22 are operatively connected to the electric motor 13 to move them linearly back and forth in a reciprocating manner. The blades 20, 22 include elongate apertures 25 (only a portion of which can be seen in FIG. 2) which allow fasteners 26 to secure the blades to the support bar 24, while allowing them to move linearly relative to the support bar.

The top blade 20 is made up of a series of first teeth 20a, and similarly the bottom blade 22 is made up of a series of second teeth 22a. The teeth 20a and 22a are spaced from one another to create gaps for the entry of debris and other vegetation to be cut by the blades. The gaps are sized so that most hedge and bush vegetation can enter the gap and be cut by the flanks of the teeth 20a, 22a through a shearing action.

Occasionally, branches or other debris will enter the gap for which the hedgetrimmer lacks the power to cut the branch, or some branches may be too large to enter the gap. In those situations, the hedgetrimmer blade assembly 18 is equipped with a saw blade assembly 28 that is able to cut through such debris as further described below.

Referring to FIG. 1, the blade assembly 18 includes two sections, first section, labelled A in FIG. 1, extends the length of the support bar 24 and includes the standard hedgetrimmer blade teeth 20a, 22a. A second section, labelled B, includes the saw blade assembly 28 for cutting through branches and other debris. This saw section B, includes a first side 30 whose cutting teeth are identical to the hedgetrimmer teeth 20a, 22a in section A. However, on the opposite side 32, the blade assembly 18 is made up of the teeth 20a, 22a from the top saw blade 34 and a bottom saw blade 36, respectively. See FIG. 3. Importantly, this section of the blade assembly does not include the support bar 24.

Figure 3:
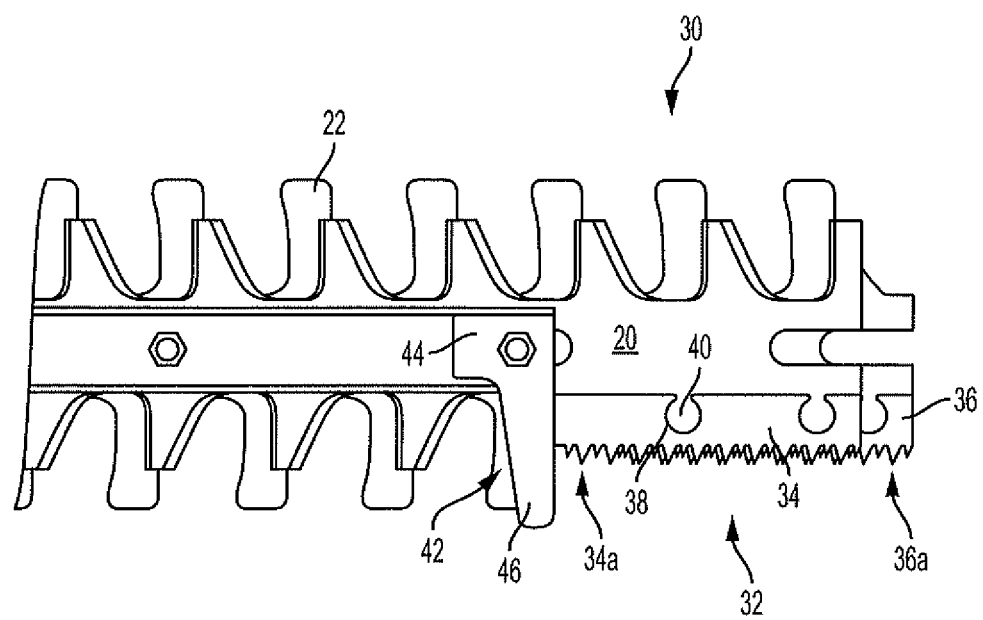
FIG. 3 is a top view of FIG. 2.
Figure 4:
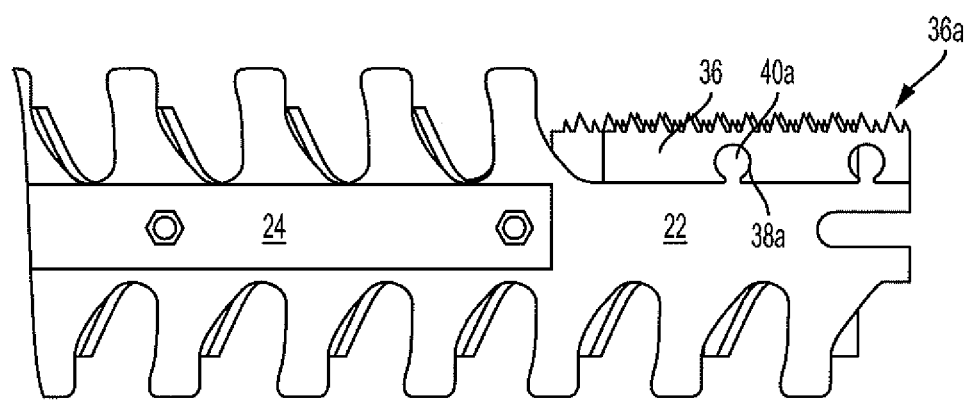
FIG. 4 is a bottom view of FIG. 2.
Figure 6:
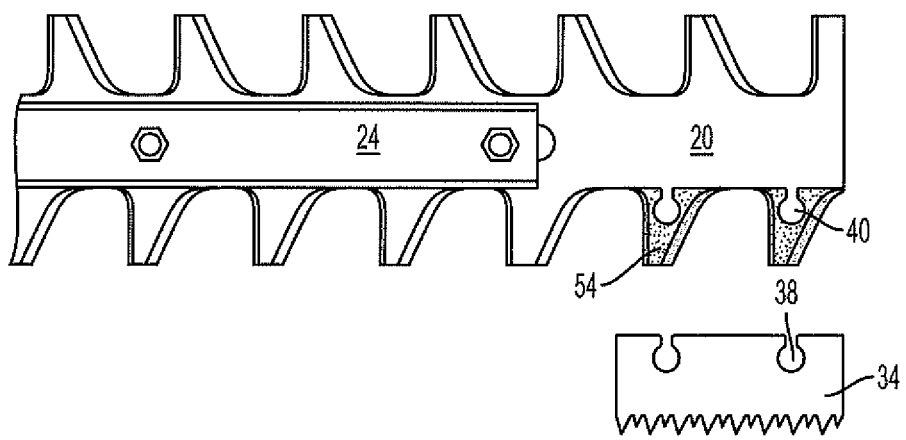
FIG. 6 shows the blade assembly and the sawblade assembly.

Referring to FIGS. 3 and 4, the saw blades 34, 36 include cutting teeth 34a, 36a, respectively, whose cutting teeth are spaced closer together and have cutting surfaces at their tips. The gap between these cutting teeth 34a, 36a should be small enough to ensure that a user's fingers cannot enter and be accidentally cut. In this way, the saw blades 34, 36 are designed so that only the tips of the teeth 34a, 36a perform the cutting action to cut through a thick branch via the reciprocating motion of the blades 20, 22. In a preferred embodiment, the top saw blade 34 is attached to the top blade 20, using an aperture 38 on the saw blade 34 that is frictionally secured to a projection 40 on the blade 20. See FIG. 6. Similarly, the bottom saw blade 36 includes an aperture 38a to secure it to a projection 40a on the bottom blade 22. The projection 40 is shown as circular, but it should be appreciated that it can take any shape. Alternatively, the saw blades 34, 36 can be formed integrally with the respective blades 20, 22.

One of the advantages of using the apertures and projections to secure the sawblade to the blade is that it simplifies manufacturing. For example, a standard hedgetrimmer blade would have its teeth extend all the way to the end of the blade. This standard blade is typically stamped from a piece of metal. To create the projections 40 from the standard hedgetrimmer blade, a second stamping action can be performed that removes the excess material (shown in shadow in FIG. 6) from a hedgetrimmer tooth 20a to leave only the projection 40. The sawblade 34 is separately manufactured with the aperture 38 and then press fit onto the projection 40. Preferably, the press fit attachment would be strong enough to secure the sawblade 34 to the hedgetrimmer blade 20, but further processing could be performed, such as welding, if desired.

This two-step process is preferable to simply manufacturing the sawblade integrally with the hedgetrimmer blade because it allows for the use of existing manufacturing tools. Using existing tooling provides the flexibility to continue to manufacture standard hedgetrimmer blades, and only when the sawblade attachment is needed, the manufacturer can then take the additional step of stamping the hedgetrimmer blade to form the protrusion and attach the sawblade. A stamping tool to form the protrusion is much cheaper than the tool necessary to form a hedgetrimmer blade. So this process requires only the new stamping tool rather than an entirely new set of tools for the hedgetrimmer blade with the integral sawblade.

Figure 7:
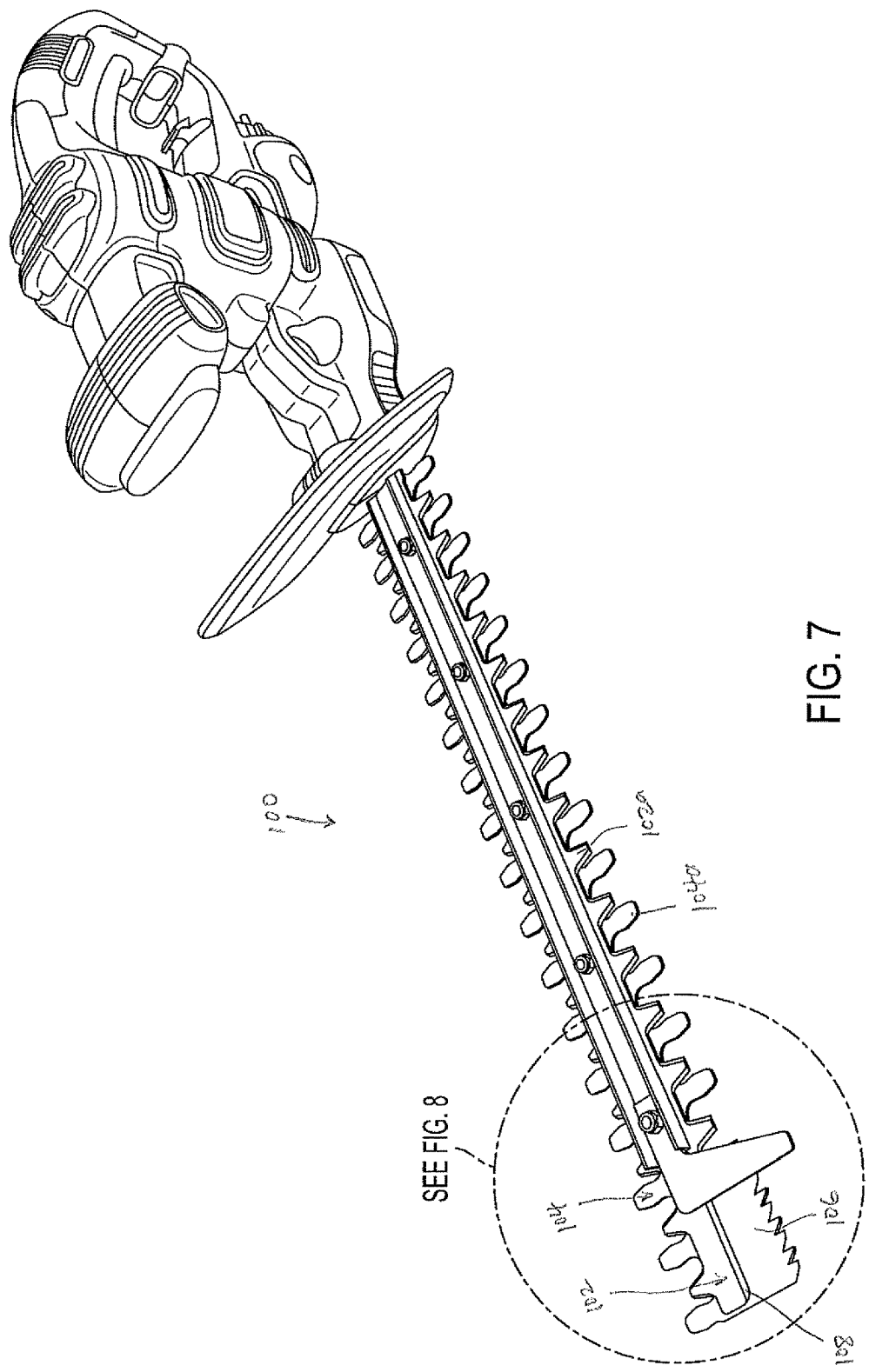
FIG. 7 shows a perspective view of a hedgetrimmer with an integral sawblade.
Figure 8:
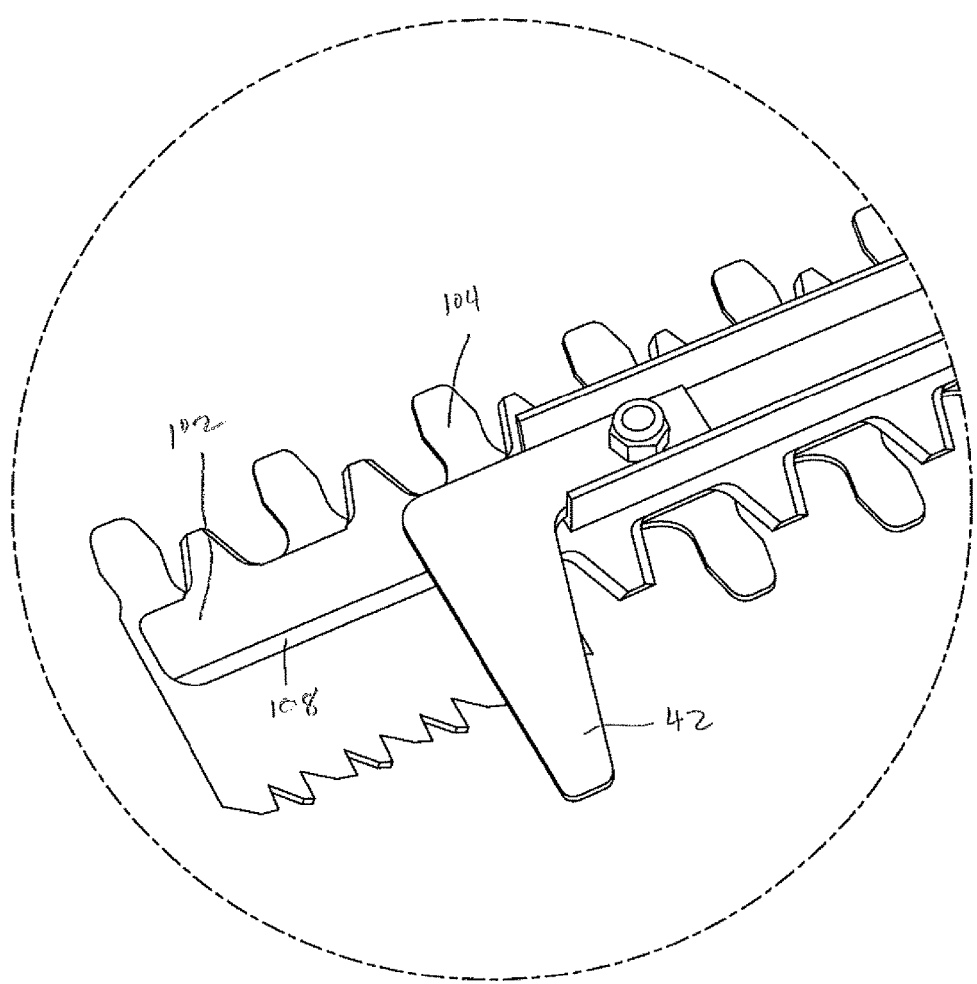
FIG. 8 shows a detailed view of the sawblade of FIG. 7.
Figure 9:
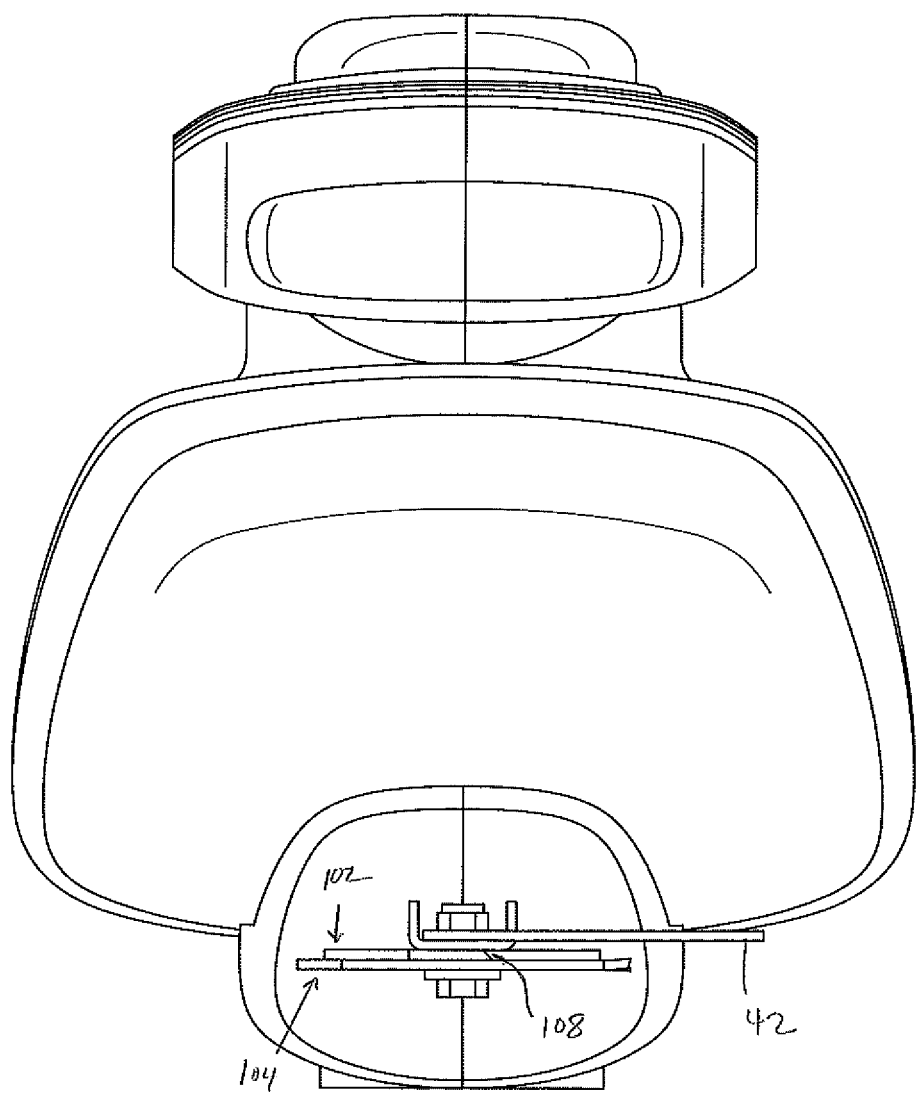
FIG. 9 shows a front end view of the hedgetrimmer of FIG. 7.

However, it should be understood that the sawblade could be manufactured integrally with the hedgetrimmer blade, as shown in FIGS. 7-9. Although this may require additional upfront costs, the resultant blade would be stronger and more durable. To possibly help offset the increased cost, only a single hedgetrimmer blade could include the sawblade portion. FIG. 7 shows a hedgetrimmer having a blade assembly 100 having a top blade 102 and a bottom blade 104, with only the bottom blade 104 having a sawblade portion 106.

The fixed top blade 102 is made up of a set of short teeth 102a on both sides of the support bar 24, and the reciprocating bottom blade 104 is made up of a set of long teeth 104a on both sides of the support bar 24. In this way, both sides of the support bar have corresponding set of long and short teeth. Alternatively, top blade could be made up of long teeth on one side and short teeth on the other side, and the bottom blade can reversed so that each side of the support bar 24 can have corresponding long teeth and short teeth similar to what shown in FIG. 7.

Importantly, the top blade 102 includes a bevelled edge 108 along an inner edge of the blade. The bevelled edge 108 provides a ramp to help separate any branch or other debris being cut, so that the branch or debris can easily pass over the top blade 102. Without the bevelled edge 108, the top blade 102 would present a sheer face that could block the passing of the branch or debris. It should be understood that the bevelled edge 108 can be of any shape or configuration so long as it assists in helping cut debris pass over the blade assembly.

Figure 2:
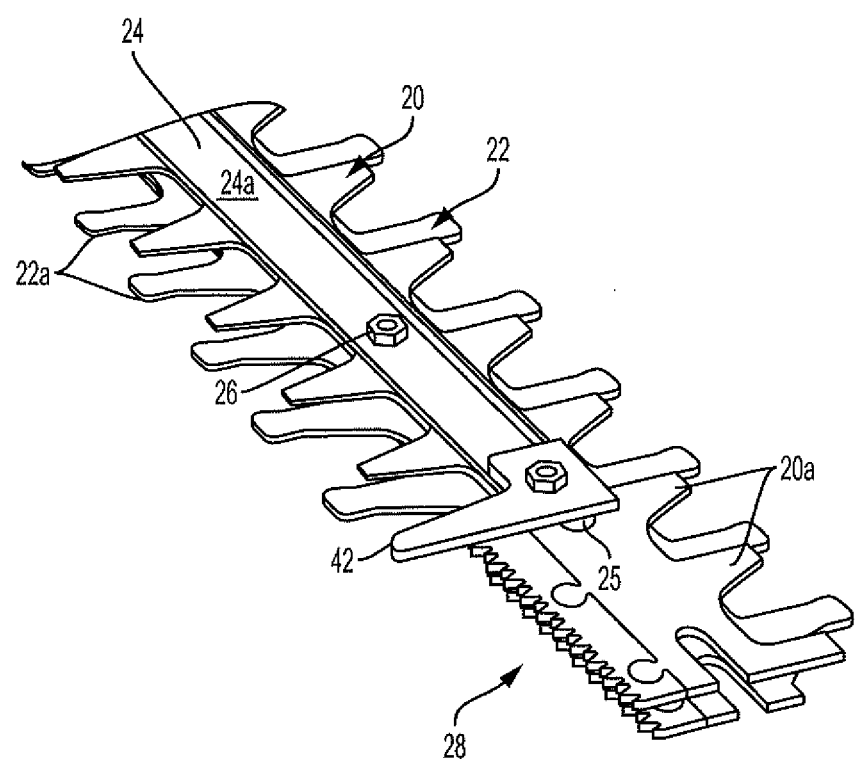
FIG. 2 is a perspective view of the saw blade assembly of FIG. 1.

Referring now to FIGS. 2, 3 and 7, an L-shaped bracket 42 is shown that is used to support a branch as it's being cut. The bracket 42 has base portion 44 that is secured to the support bar 24. The support bar 24 is generally U-shaped, with a central channel 24a. The base portion 44 is secured within this channel 24a using a nut and bolt or any other similar means. The bracket also includes a support arm 46 that is perpendicular to the base portion 44. The support arm 46 is used to brace a branch or other debris that's being cut, and keep it stationary as the saw assembly 28 cuts through it. Without the bracket 42, a branch would be more likely to simply move away from the saw assembly 28 as it's brought into engagement with the branch.

Figure 5A:
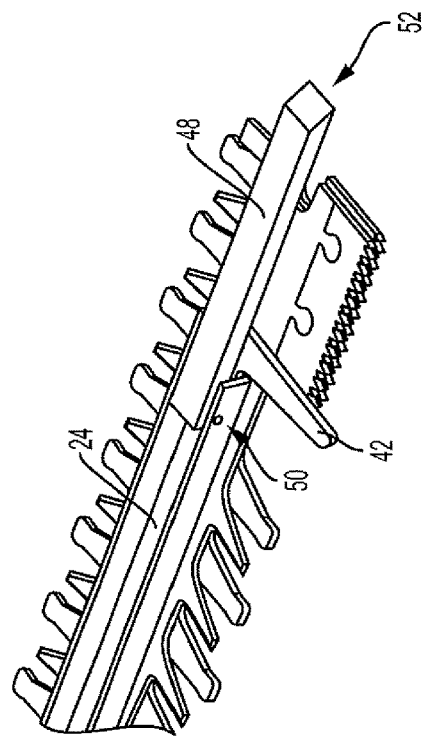
FIG. 5A is an embodiment of FIG. 1 showing a guard bar in the retracted position.
Figure 5B:
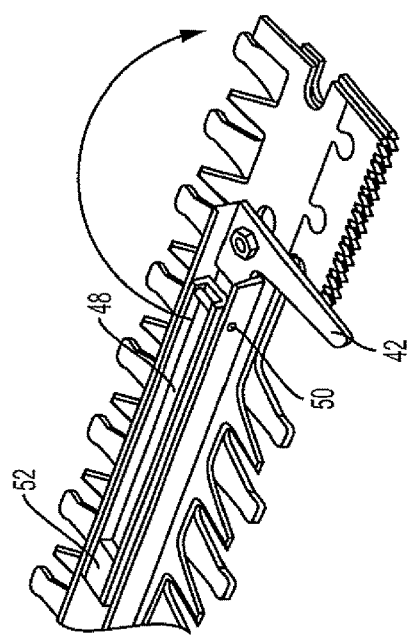
FIG. 5B is similar to FIG. 5A, with the guard bar in the extended position.

Referring now to FIGS. 5A and 5B, a further embodiment of the invention is shown having a guard bar 48. The guard bar is pivotally secured in the central channel 24a of the support bar 24. As shown, it is placed on top of the bracket 42, and fixed to the sides of the U-shaped support bar 24 by a pin 50 that acts as an axle allowing the guard bar to rotate. The guard bar has two positions, a first closed position shown in FIG. 5A shows the guard bar 48 folded back onto the support bar 24. FIG. 5B shows a second open position where the guard bar 48 is extended out. When in this position, the tip of the guard bar extends beyond the blade assembly 18. The guard bar 48 prevents the blade assembly from damaging a structure when the hedgetrimmer is in use, such as when there are hedges or bushes along a building or other structure. This helps to protect the structure itself from damage, as well as the hedgetrimmer. Additionally, the tip of the guard bar 48 can include a rubber tip 52 to further protect the structure from damage. The tip 52 does not have to be rubber, but can be any resilient material that can absorb an impact and prevents scuffing or leaving other visible marks. The guard bar 48 can be locked in the closed or open through the frictional engagement with the sides of the U-shaped channel. Additionally, more secure lock can be used to secure the guard bar in either position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A vegetation cutting device, comprising:
   a housing containing a motor;
   a blade assembly extending out from the housing, the blade assembly having a support bar and a first blade and a second blade for cutting vegetation, the first and second blades including cutting teeth, the motor operatively connected to the first blade to move it in a reciprocal motion;
   wherein the first blade has a sawblade portion on a distal end of the first blade; and
   wherein the second blade has a portion free of cutting teeth and including a beveled edge extending in a longitudinal direction of the blade assembly, and wherein the beveled edge is adjacent the sawblade portion for assisting in helping cut debris pass over the blade assembly.

2. The vegetation cutting device of claim 1, wherein the sawblade portion extends beyond the support bar.

3. The vegetation cutting device of claim 2, further including a bracket secured to the support bar to support vegetation as it's being cut by the sawblade portion.

4. The vegetation cutting device of claim 3, wherein the bracket is generally L-shaped, and includes a base portion that is secured within a U-shaped channel of the support bar, and a support arm that contacts the vegetation to be cut.

5. The vegetation cutting device of claim 1, further including a guard bar pivotally secured a distal end of the support bar, the guard bar being movable between a retracted position and an extended position where its tip extends beyond the blade assembly.

6. The vegetation cutting device of claim 1, wherein the first blade cutting teeth extend beyond the support bar and face a first direction, and the sawblade portion faces a second direction opposite the first direction.

7. A hedgetrimmer, comprising:
   a housing containing a motor;
   a blade assembly extending out from the housing, the blade assembly having a support bar, a first blade having a first set of cutting teeth and a second blade having a second set of cutting teeth, the motor operatively connected to the first blade to move it in a reciprocal motion;
   the first blade having a sawblade portion with a third set of cutting teeth, different than the first set or second set of cutting teeth; and
   the second blade has a portion free of cutting teeth and including a beveled edge extending in a longitudinal direction of the blade assembly, and wherein the beveled edge is adjacent the sawblade portion for assisting in helping cut debris pass over the blade assembly.

8. The hedgetrimmer of claim 7, wherein a portion of the first set of cutting teeth is on the first blade opposite to the sawblade portion.

9. The hedgetrimmer of claim 7, further comprising a bracket secured adjacent the sawblade portion to support any vegetation being cut by the sawblade portion.

10. The hedgetrimmer of claim 9, wherein the bracket is generally L-shaped.

11. The hedgetrimmer of claim 7, further comprising a guard bar pivotally secured to a distal end of the support bar, the guard bar being movable between a retracted position and an extended position where its tip extends beyond the blade assembly.

* * * * *